United States Patent
Wei et al.

(10) Patent No.: US 9,242,443 B2
(45) Date of Patent: *Jan. 26, 2016

(54) METHOD FOR MAKING CARBON NANOTUBE COMPOSITE HOLLOW STRUCTURE

(71) Applicants: Tsinghua University, Beijing (CN); HON HAI PRECISION INDUSTRY CO., LTD., New Taipei (TW)

(72) Inventors: Yang Wei, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 169 days.

This patent is subject to a terminal disclaimer.

(21) Appl. No.: 14/015,038

(22) Filed: Aug. 30, 2013

(65) Prior Publication Data

US 2013/0340922 A1      Dec. 26, 2013

Related U.S. Application Data

(63) Continuation of application No. 13/185,296, filed on Jul. 18, 2011, now abandoned.

(51) Int. Cl.
*B32B 37/14* (2006.01)
*C08K 7/24* (2006.01)

(52) U.S. Cl.
CPC . *B32B 37/14* (2013.01); *C08K 7/24* (2013.01); *Y10T 428/1352* (2015.01)

(58) Field of Classification Search
CPC ....................................................... B32B 37/14
USPC ............................................ 156/169, 173, 175
See application file for complete search history.

(56) References Cited

U.S. PATENT DOCUMENTS

| | | | | |
|---|---|---|---|---|
| 2,614,058 | A * | 10/1952 | Francis | 156/171 |
| 6,458,231 | B1 * | 10/2002 | Wapner et al. | 156/173 |
| 8,470,221 | B2 * | 6/2013 | Wei et al. | 264/172.11 |
| 2008/0087646 | A1 | 4/2008 | Liu et al. | |

FOREIGN PATENT DOCUMENTS

TW        I323028        4/2010

* cited by examiner

*Primary Examiner* — Jeff Aftergut
(74) *Attorney, Agent, or Firm* — Novak Druce Connolly Bove + Quigg LLP

(57) ABSTRACT

A method for making a carbon nanotube composite hollow structure is provided. The method includes: passing a linear structure through a hollow rotating shaft and fixing the linear structure on the collecting unit; drawing a carbon nanotube structure from a carbon nanotube array loaded on the face plate, and adhering one end of the carbon nanotube structure to part of the linear structure between the wrapping unit and the collecting unit; forming a first carbon nanotube composite wire collected by the collecting unit by rotating the face plate and pulling the linear structure along a fixed direction such that the carbon nanotube structure wraps around the linear structure; forming a second carbon nanotube composite structure by applying a polymer liquid to the first carbon nanotube composite structure; and forming the carbon nanotube composite hollow structure by removing the linear structure from the second carbon nanotube composite structure.

20 Claims, 11 Drawing Sheets

METHOD FOR MAKING CARBON NANOTUBE COMPOSITE HOLLOW STRUCTURE

RELATED APPLICATIONS

This application is a continued application of U.S. patent application, entitled "CARBON NANOTUBE COMPOSITE HOLLOW STRUCTURE AND METHOD FOR MAKING THE SAME" with application Ser. No. 13/185,296, filed on Jul. 18, 2011. U.S. patent application Ser. No. 13/185,296, claims all benefits accruing under 36 U.S.C. §119 from China Patent Application No. 201010259930.0, filed on Aug. 23, 2010 in the China Intellectual Property Office, the disclosure of which is incorporated herein by reference.

BACKGROUND

1. Technical Field

The present disclosure relates to a carbon nanotube composite hollow structure.

2. Discussion of Related Art

Carbon nanotubes have interesting and potentially useful electrical and mechanical properties. Due to these and other properties, carbon nanotubes have become a significant focus of research and development for use in electron emitting devices, sensors, transistors, and other devices.

It is becoming increasingly popular for carbon nanotubes to be used to make composite materials. Carbon nanotubes can be composed of a plurality of coaxial cylinders of graphite sheets. Carbon nanotubes composited with metals, semiconductors, or polymers result in a composite material with qualities of both materials. Generally, the composite has a solid linear structure or a sheet-shaped structure. However, macro-scale carbon nanotube hollow structures and methods for making the same are not provided.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

Figure 1:
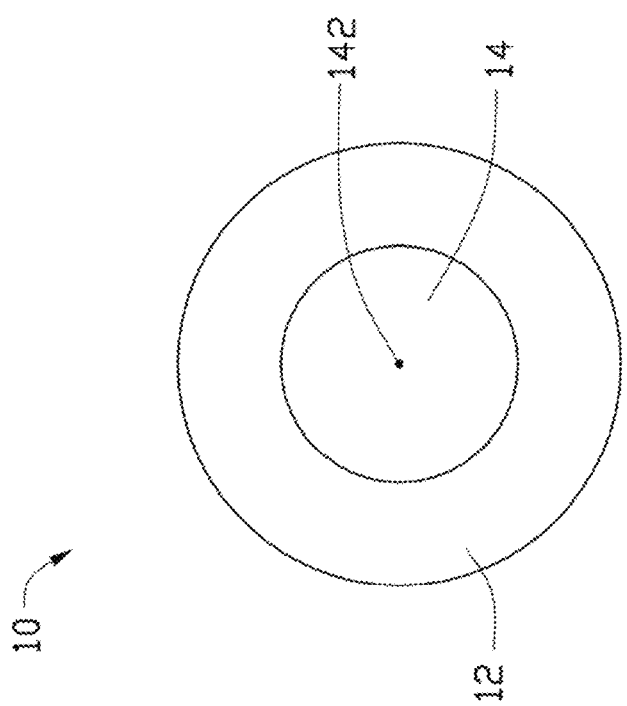
FIG. 1 is a schematic side view of one embodiment of a carbon nanotube composite hollow structure including a carbon nanotube composite layer.

Referring to FIG. 1, one embodiment of a carbon nanotube composite hollow structure 10 is provided. The carbon nanotube composite hollow structure 10 is a freestanding tube-shaped structure. The cross-section of the outline of the carbon nanotube composite hollow structure 10 along a direction substantially perpendicular to the length of the carbon nanotube composite hollow structure 10 can be rectangular, trapezoid-shaped, circle-shaped, or ellipse-shaped. The carbon nanotube composite hollow structure 10 includes a carbon nanotube composite layer 12 and a through hole 14.

The outline of the through hole 14 can be similar to the outline of the carbon nanotube composite hollow structure 10. That is, the inner wall of the carbon nanotube composite hollow structure 10 can be rectangular, trapezoid-shaped, circle-shaped, or ellipse-shaped. It can be noted that the shape of the through hole 14 can be selected as desired. The through hole 14 can be substantially defined in the center of the carbon nanotube composite layer 12. The carbon nanotube composite layer 12 and the through hole 14 have a common linear axis 142. In one embodiment, an effective diameter of the through hole 14 can be larger than 10 micrometers ($\mu$m). In another embodiment, the effective diameter of the through hole 14 is larger than 18 $\mu$m. The thickness of the carbon nanotube composite layer 12 can be substantially the same.

The carbon nanotube composite hollow structure 10 can be a composite structure including a polymer and at least one carbon nanotube structure. The carbon nanotube structure can include at least one carbon nanotube film or at least one carbon nanotube wire. The carbon nanotube structure includes a plurality of carbon nanotubes. At least part of the polymer can be directly attached to the at least one carbon nanotube structure. The carbon nanotubes surround the through hole 14. Axes of the carbon nanotubes along the length direction of the carbon nanotubes can be substantially parallel to an outer surface of the carbon nanotube composite hollow structure 10.

Figure 2:
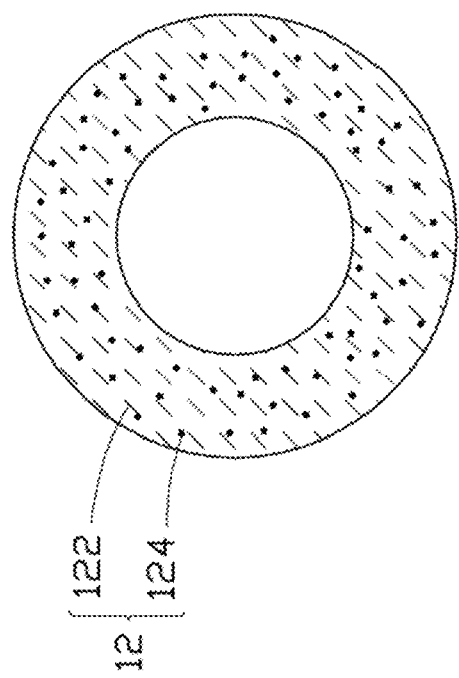
FIG. 2 is a cross-sectional view of one embodiment of the carbon nanotube composite layer shown in FIG. 1.

Referring to FIG. 2, one embodiment of the carbon nanotube composite layer 12 is provided. The carbon nanotube composite layer 12 can include a plurality of carbon nanotubes 122 and a polymer 124 dispersed between the carbon nanotubes 122. The plurality of carbon nanotubes 122 form the at least one carbon nanotube structure. That is to say, the polymer 124 is dispersed in the at least one carbon nanotube structure.

Specifically, the carbon nanotubes 122 define a plurality of micropores. The polymer 124 is filled in the interspaces and wraps around the carbon nanotubes 122. The carbon nanotubes 122 surrounding the axis 142 are tightly combined with each other by van der Waals attractive force therebetween. The carbon nanotubes 122 and the polymer 124 cooperatively form the tube wall of the carbon nanotube composite hollow structure 10. In one embodiment, the carbon nanotube composite hollow structure 10 has a tube structure, and the carbon nanotubes 122 and the polymer 124 are uniformly dispersed in the carbon nanotube composite hollow structure.

The polymer 124 can be epoxy resin, acrylic resin, polyimides, polyvinyl alcohol, polyester, silastic, thermal conductive adhesive, or any combinations thereof.

Figure 3:
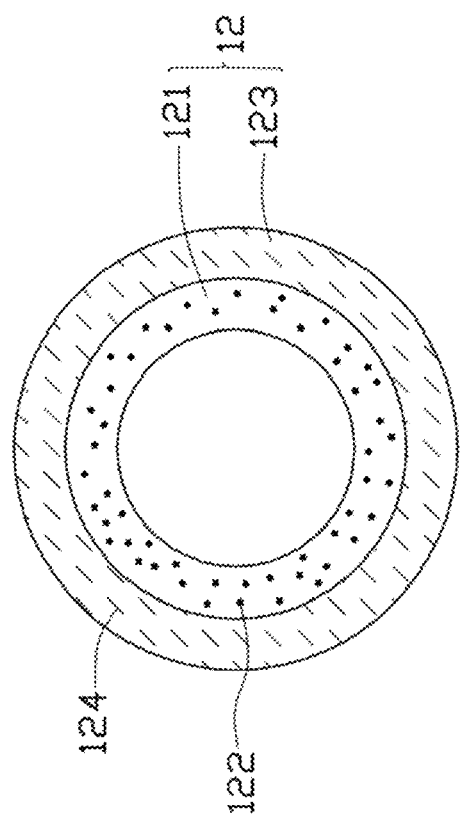
FIG. 3 is a cross-sectional view of another embodiment of the carbon nanotube composite layer shown in FIG. 1.

Referring to FIG. 3, another embodiment of the carbon nanotube composite layer 12 is also provided. The carbon nanotube composite layer 12 can include a carbon nanotube layer 121 including at least one carbon nanotube structure including the carbon nanotubes 122, and a polymer layer 123 located on an outer surface of the carbon nanotube layer 121. In one embodiment, the polymer layer 123 is the polymer 124 coated on the outer surface of the carbon nanotube layer 121.

Specifically, the carbon nanotube layer 121 and the polymer layer 123 cooperatively form the wall of the carbon nanotube composite hollow structure 10. The polymer layer 123 wraps around the carbon nanotube layer 121. An inner surface of the carbon nanotube layer 121 surrounds the through hole 14. The polymer layer 123 is an outer layer of the carbon nanotube composite hollow structure 10 away from the through hole 14.

The carbon nanotubes 122 in the at least one carbon nanotube film or at least one carbon nanotube wire can be orderly or disorderly aligned in the carbon nanotube composite layer 12. The disorderly aligned carbon nanotubes are carbon nanotubes arranged along many different directions, such that the number of carbon nanotubes arranged along each different direction can be almost the same (e.g. uniformly disordered), and/or entangled with each other. The orderly aligned carbon nanotubes are carbon nanotubes arranged in a consistently systematic manner, e.g., most of the carbon nanotubes are arranged approximately along a same direction or have two or more sections within each of which the most of the carbon nanotubes are arranged approximately along a same direction (different sections can have different directions). The carbon nanotubes can be single-walled, double-walled, and/or multi-walled carbon nanotubes. The diameters of the single-walled carbon nanotubes can range from about 0.5 nanometers (nm) to about 50 nm. The diameters of the double-walled carbon nanotubes can range from about 1 nm to about 50 nm. The diameters of the multi-walled carbon nanotubes can range from about 1.5 nm to about 50 nm.

The at least one carbon nanotube film and the at least one carbon nanotube wire can be a freestanding structure. The freestanding structure may have a planar shape or a linear shape.

Figure 4:
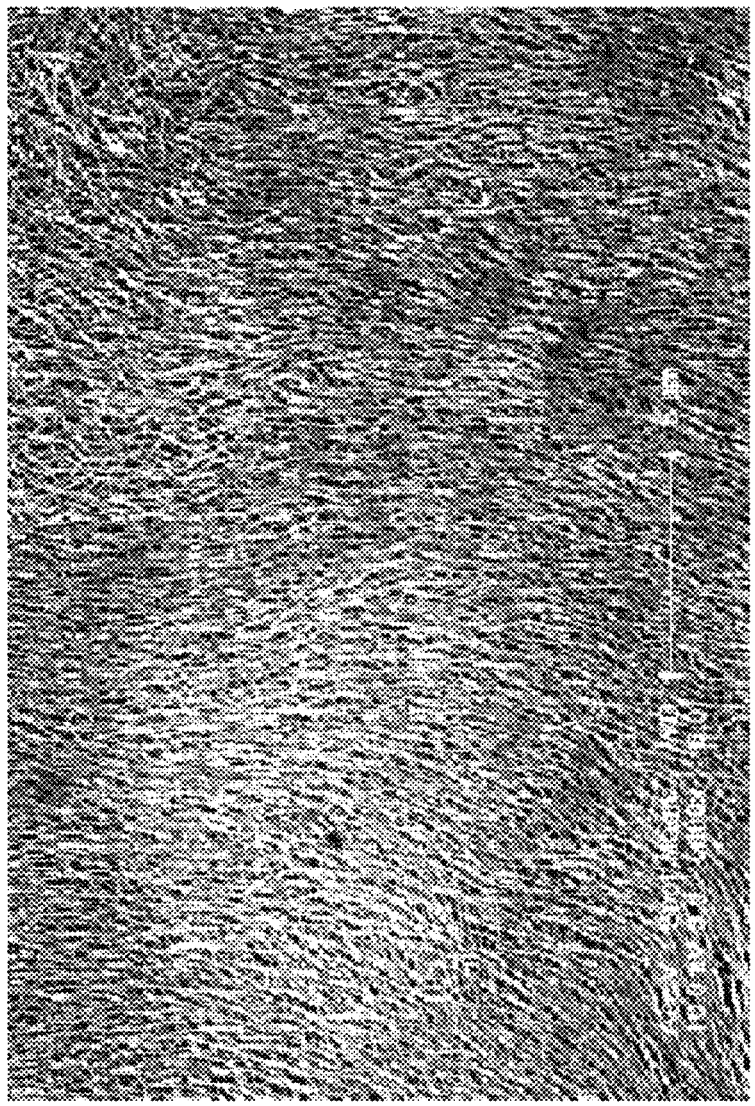
FIG. 4 shows a scanning electron microscope (SEM) image of a pressed carbon nanotube film with the carbon nanotubes therein arranged along a preferred orientation.

Referring to FIG. 4, the carbon nanotube film can be a pressed carbon nanotube film formed by pressing a carbon nanotube array down on the substrate. The carbon nanotubes in the pressed carbon nanotube film are arranged along the same direction or along different directions. The carbon nanotubes in the pressed carbon nanotube film can rest upon each other. Adjacent carbon nanotubes are attracted to each other and are combined by van der Waals attractive force. An angle between a primary alignment direction of the carbon nanotubes and a surface of the pressed carbon nanotube film is about 0 degrees to approximately 15 degrees. The greater the pressure applied, the smaller the angle obtained. If the carbon nanotubes in the pressed carbon nanotube film are arranged along different directions, the carbon nanotube structure can be isotropic. The thickness of the pressed carbon nanotube film can range from about 0.5 nm to about 1 mm. The length of the carbon nanotubes can be larger than 50 μm. Clearances can exist in the carbon nanotube array. Therefore, micropores can exist in the pressed carbon nanotube film and be defined by the adjacent carbon nanotubes. Examples of the pressed carbon nanotube film are taught by US PGPub. 20080299031A1 to Liu et al.

If the carbon nanotube composite hollow structure 10 includes at least one pressed carbon nanotube film. The at least one pressed carbon nanotube film can be substantially coiled around the through hole 14 to form a plurality of coils, with adjacent coils tightly combined with each other by van der Waals attractive force therebetween. The polymer can be filled in the micropores defined by the carbon nanotubes of the at least one pressed carbon nanotube film to form the carbon nanotube composite layer 12, or surround a surface of the at least one pressed carbon nanotube film to form the carbon nanotube composite layer 12. The carbon nanotubes 122 in the carbon nanotube composite layer 12 can be uniformly arranged along the linear axis 142, and adjacent carbon nanotubes 122 are attracted to each other and combined by van der Waals attractive force. An angle between a primary alignment direction of the carbon nanotubes and the linear axis 142 can be about 0 degrees to about 15 degrees.

Figure 5:
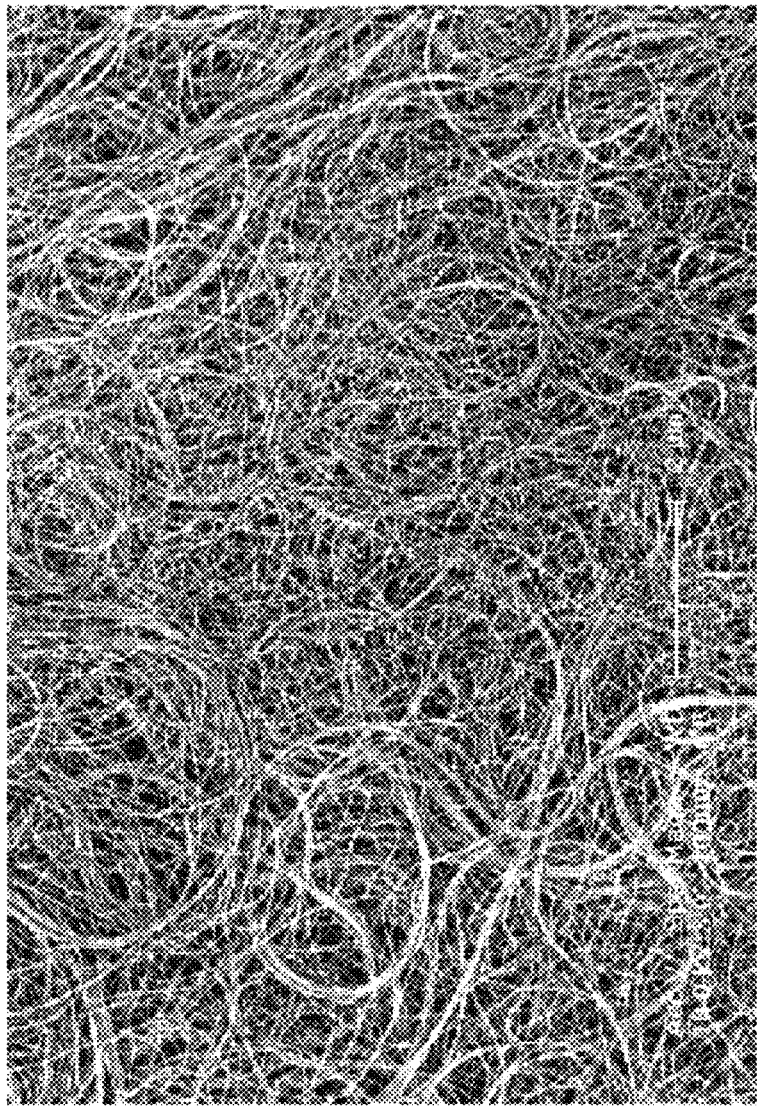
FIG. 5 shows an SEM image of a flocculated carbon nanotube film with carbon nanotubes entangled with each other therein.

Referring to FIG. 5, the carbon nanotube film can also be a flocculated carbon nanotube film formed by a flocculating method. The flocculated carbon nanotube film can include a plurality of long, curved, disordered carbon nanotubes entangled with each other. A length of the carbon nanotubes can be greater than 10 centimeters. In one embodiment, the length of the carbon nanotubes is in a range from about 200 μm to about 900 μm. Further, the flocculated carbon nanotube film can be isotropic. Here, "isotropic" means the carbon nanotube film has properties identical in all directions substantially parallel to a surface of the carbon nanotube film. The carbon nanotubes can be substantially uniformly distributed in the carbon nanotube film. The adjacent carbon nanotubes are acted upon by the van der Waals attractive force therebetween, thereby forming an entangled structure with micropores defined therein. The thickness of the flocculated carbon nanotube film can range from about 1 μm to about 1 mm. In one embodiment, the thickness of the flocculated carbon nanotube film is about 100 μm.

If the carbon nanotube composite hollow structure 10 includes at least one flocculated carbon nanotube film, the at least one flocculated carbon nanotube film can be spirally arranged around the through hole 14 to form a plurality of coils, with adjacent coils tightly combined with each other by van der Waals attractive force therebetween. The polymer can be filled in the micropores defined by the carbon nanotubes to form the carbon nanotube composite layer 12, or surround a surface of the at least one flocculated carbon nanotube film to form the carbon nanotube composite layer 12. The carbon nanotubes 122 in the carbon nanotube composite layer 12 can be substantially uniformly arranged around the linear axis 142 by van der Waals attractive force therebetween. The carbon nanotubes 122 are substantially entangled with each other and can be substantially parallel to the outline of the carbon nanotube composite hollow structure 10.

Figure 6:
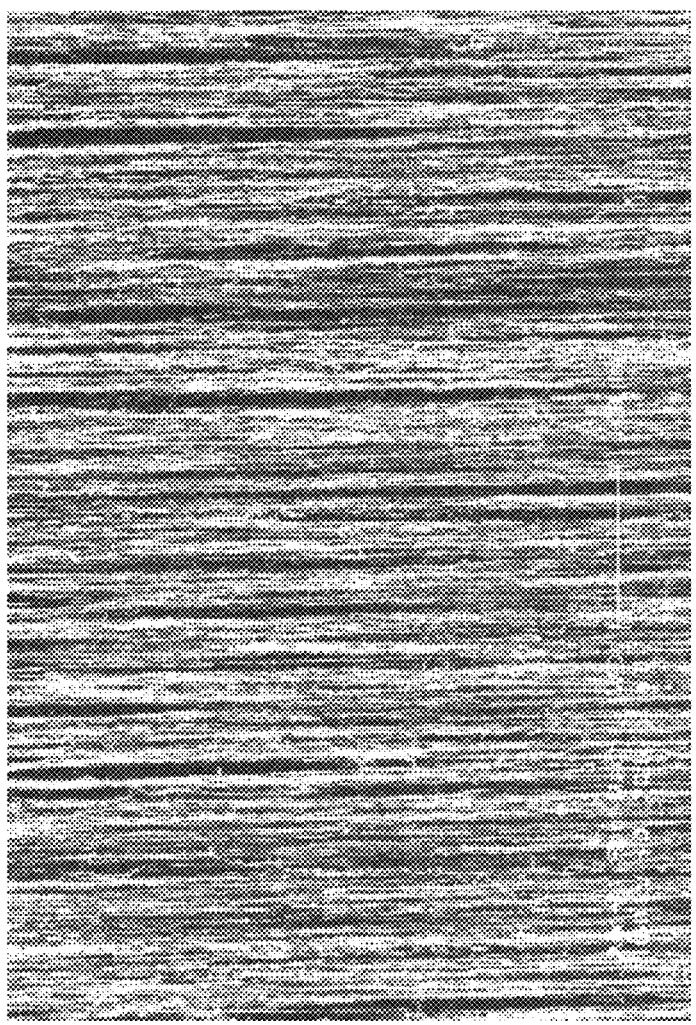
FIG. 6 shows an SEM image of a drawn carbon nanotube film.

Referring to FIG. 6, the carbon nanotube film can also be a drawn carbon nanotube film formed by drawing a film from a carbon nanotube array. Examples of the drawn carbon nanotube film are taught by U.S. Pat. No. 7,045,108 to Jiang et al. The thickness of the drawn carbon nanotube film can be in a range from about 0.5 nm to about 100 μm.

The drawn carbon nanotube film includes a plurality of carbon nanotubes that are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction by van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. It can be understood that some variation can occur in the orientation of the carbon nanotubes in the drawn carbon nanotube film. Microscopically, the carbon nanotubes oriented substantially along the same direction may not be perfectly aligned in a straight line, and some curved portions may exist. It can be understood that contact between some carbon nanotubes located substantially side by side and oriented along the same direction cannot be totally excluded.

More specifically, the drawn carbon nanotube film can include a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity, and shape. The carbon nanotubes in the drawn carbon nanotube film are also substantially oriented along a preferred orientation. The width of the drawn carbon nanotube film relates to the carbon nanotube array from which the drawn carbon nanotube film is drawn.

The carbon nanotube structure can include more than one drawn carbon nanotube film. An angle can exist between the orientation of carbon nanotubes in adjacent films, stacked, and/or coplanar. Adjacent carbon nanotube films can be bonded by van der Waals attractive force therebetween without an additional adhesive. An angle between the aligned directions of the carbon nanotubes in two adjacent drawn carbon nanotube films can range from about 0 degrees to about 90 degrees. Spaces are defined between two adjacent carbon nanotubes in the drawn carbon nanotube film. If the angle between the aligned directions of the carbon nanotubes in adjacent drawn carbon nanotube films is larger than 0 degrees, the micropores can be defined by the crossed carbon nanotubes in adjacent drawn carbon nanotube films.

Figure 7:
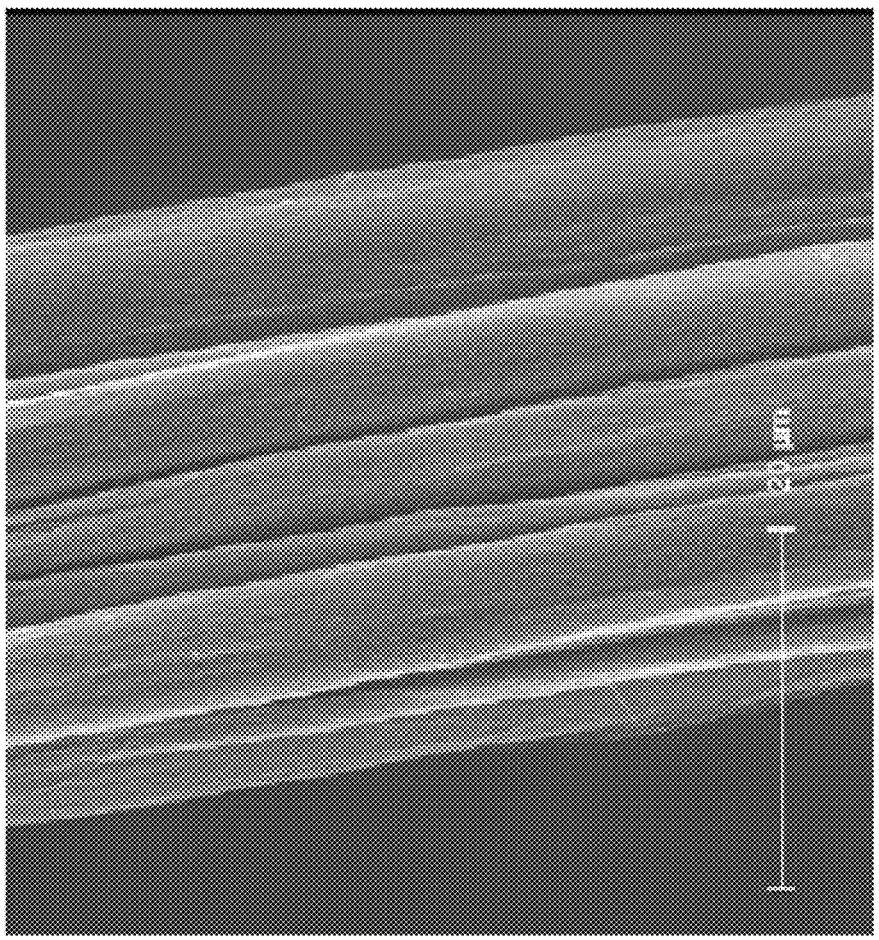
FIG. 7 shows an SEM image of an untwisted carbon nanotube wire.

The carbon nanotube wire itself can be untwisted or twisted. Referring to FIG. 7, treating the drawn carbon nanotube film with a volatile organic solvent can obtain the untwisted carbon nanotube wire. In one embodiment, the organic solvent is applied to soak the entire surface of the drawn carbon nanotube film. During the soaking, the adjacent substantially parallel carbon nanotubes in the drawn carbon nanotube film will bundle together due to the surface tension of the organic solvent as it volatilizes, and thus, the drawn carbon nanotube film will be shrunken into an untwisted carbon nanotube wire. The untwisted carbon nanotube wire includes a plurality of carbon nanotubes substantially oriented along a same direction (i.e., a direction along the length direction of the untwisted carbon nanotube wire). The carbon nanotubes are substantially parallel to the axis of the untwisted carbon nanotube wire. In one embodiment, the untwisted carbon nanotube wire includes a plurality of successive carbon nanotubes joined end to end by the van der Waals force therebetween. A length of the untwisted carbon nanotube wire can be arbitrarily set as desired. A diameter of the untwisted carbon nanotube wire can range from about 0.5 nm to about 100 µm. Examples of the untwisted carbon nanotube wire are taught by US Patent Application Publication US 2007/0166223 to Jiang et al.

If the carbon nanotube composite hollow structure 10 includes at least one drawn carbon nanotube film, or at least one untwisted carbon nanotube wire, the at least one drawn carbon nanotube film or the at least one untwisted carbon nanotube wire can be spirally arranged around the through hole 14 to form a plurality of coils, with adjacent coils tightly combined with each other by van der Waals attractive force therebetween. The polymer can be filled in the micropores defined by the carbon nanotubes of the at least one drawn carbon nanotube film or at least one untwisted carbon nanotube wire to form the carbon nanotube composite layer 12, or surround a surface of the at least one drawn carbon nanotube film or at least one untwisted carbon nanotube wire to form the carbon nanotube composite layer 12.

Most of the carbon nanotubes 122 in the carbon nanotube composite layer 12 can be uniformly arranged around the linear axis 142. Most adjacent carbon nanotubes 122 substantially extending along the same direction are joined end-to-end by van der Waals attractive force. Furthermore, most of the carbon nanotubes 122 can substantially spirally extend along the linear axis 142. Namely, most of the carbon nanotubes 122 can substantially spirally extend along the inner wall of the carbon nanotube composite hollow structure 10. An angle is defined between most of the carbon nanotubes and the linear axis 142. The angle can be larger than 0 degrees and less than or equal to 90 degrees. Carbon nanotubes 122 in each drawn carbon nanotube film or untwisted carbon nanotube wire can extend along a same direction, such that angles defined between most of the carbon nanotubes 122 and the linear axis 142 can be substantially equal to each other.

Figure 8:
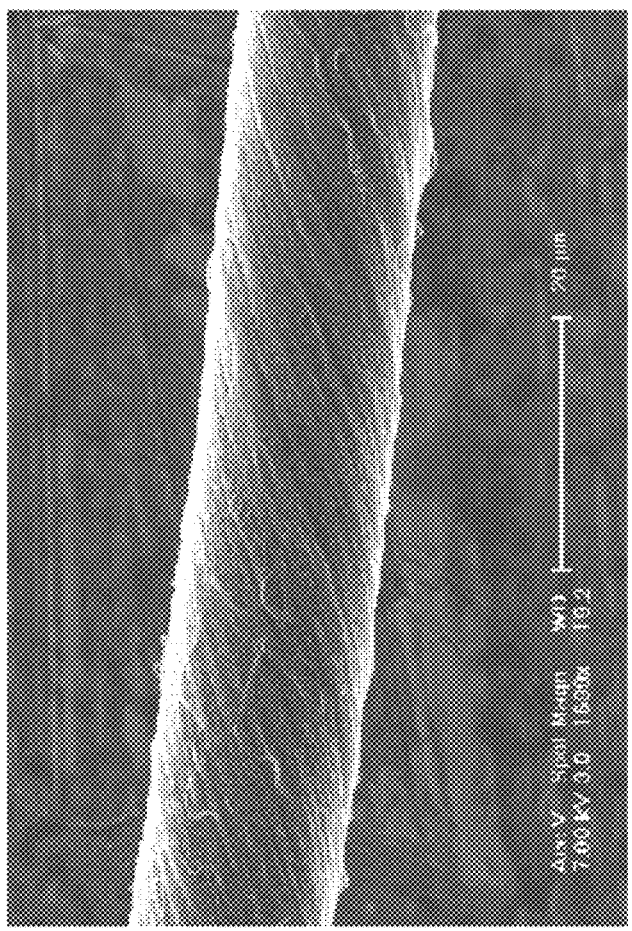
FIG. 8 shows an SEM image of a twisted carbon nanotube wire.

Referring to FIG. 8, the twisted carbon nanotube wire can be obtained by twisting a drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire. In one embodiment, the twisted carbon nanotube wire includes a plurality of successive carbon nanotubes joined end to end by van der Waals attractive force therebetween. The length of the carbon nanotube wire can be set as desired. A diameter of the twisted carbon nanotube wire can be from about 0.5 nm to about 100 µm.

The twisted carbon nanotube wire can be treated with a volatile organic solvent, before or after being twisted. After being soaked by the organic solvent, the adjacent substantially parallel carbon nanotubes in the twisted carbon nanotube wire will bundle together due to the surface tension of the organic solvent when the organic solvent volatilizes. The specific surface area of the twisted carbon nanotube wire will decrease. The density and strength of the twisted carbon nanotube wire will increase.

If the carbon nanotube composite hollow structure 10 includes at least one twisted carbon nanotube wire, the at least one twisted carbon nanotube wire can be spirally arranged around the through hole 14 to form a plurality of coils. Adjacent coils are tightly combined with each other by van der Waals attractive force therebetween. The polymer can be dispersed between the carbon nanotubes of the at least one twisted carbon nanotube wire to form the carbon nanotube composite layer 12, or surround a surface of the at least one twisted carbon nanotube wire to form the carbon nanotube composite layer 12. Most of the carbon nanotubes 122 in the carbon nanotube composite layer 12 are joined end-to-end and uniformly located around the linear axis 142 by van der Waals attractive force therebetween.

In one embodiment, the carbon nanotube composite hollow structure 10 has a hollow tube-shaped structure with an inner diameter of about 25 μm and an outer diameter of about 50 μm. The shape of the cross-section of the carbon nanotube composite hollow structure 10 is a ring. The carbon nanotube composite hollow structure 10 includes a plurality of carbon nanotubes 122 and silastic. The carbon nanotubes 122 and the silastic cooperatively form the carbon nanotube composite layer 12. The carbon nanotube tubes 122 are tightly combined by van der Waals attractive force to form the carbon nanotube layer 121 in the carbon nanotube composite layer 12 and define the through hole 14 with the diameter of about 25 μm. Most of the silastic is formed into a silastic layer located on the carbon nanotube layer 121, and part of the silastic is infiltrated into the carbon nanotube layer 121.

Specifically, six drawn carbon nanotube films spiral upwards to form a carbon nanotube tube structure and define the through hole 14, the silastic surrounds the carbon nanotube tube structure and is filled in a part of the micropores in the carbon nanotube tube structure, thereby forming the carbon nanotube composite hollow structure 10. Most of the carbon nanotubes 122 oriented along a same direction are joined end-to-end by van der Waals attractive force.

Furthermore, most of the carbon nanotubes 122 substantially spirally extend along the linear axis 142. The silastic substantially surrounds the linear axis 142. Angles (not shown) defined by the carbon nanotubes 122 and the linear axis 142 are about 45 degrees. Most of the carbon nanotubes 122 in each drawn carbon nanotube film are substantially oriented along a same direction such that angles defined by the carbon nanotubes 122 and the linear axis 142 are substantially the same.

Figure 9:
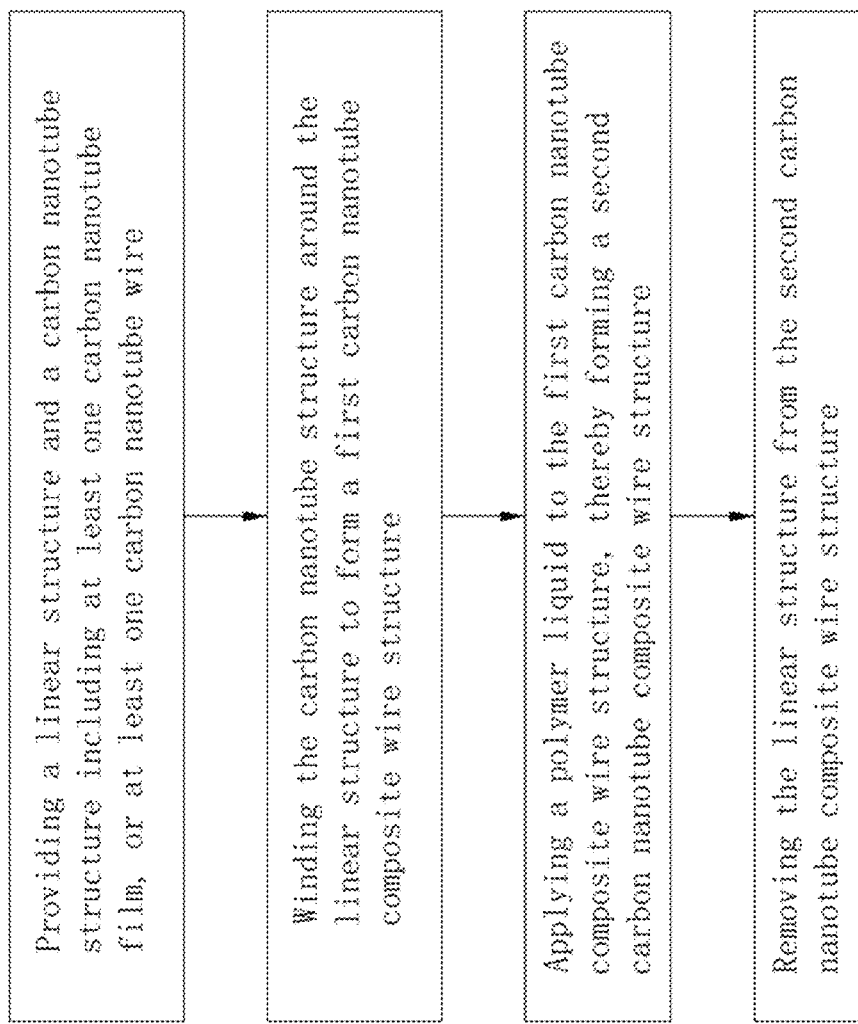
FIG. 9 shows a flow chart of one embodiment of a method for making a carbon nanotube composite hollow structure.

Referring to FIG. 9, one embodiment of a method for making the carbon nanotube composite hollow structure 10 is provided. The method can include the following steps:

(a), providing a linear structure and a carbon nanotube structure including at least one carbon nanotube film or at least one carbon nanotube wire;

(b), winding the carbon nanotube structure around the linear structure to form a first carbon nanotube composite wire structure;

(c), applying a polymer liquid to the first carbon nanotube composite wire structure, thereby forming a second carbon nanotube composite wire structure; and (d), removing the linear structure from the second carbon nanotube composite wire structure.

In step (a), the linear structure is configured to support the carbon nanotube structure. Therefore the linear structure should have a certain strength and toughness. In addition, the linear structure should be easily removed by a chemical method or a physical method. The material of the linear structure can be metal, alloy, or plastics. The cross sectional view of the linear structure along a direction substantially perpendicular to the linear structure, can be rectangular, trapezoid shaped, circle shaped, or ellipse shaped.

The step (b) can include the following steps: (b1), adhering one end of the carbon nanotube structure to the linear structure; and (b2), rotating the linear structure with the carbon nanotube structure, and simultaneously moving the linear structure or the carbon nanotube structure along a fixed direction, thereby forming the carbon nanotube composite wire structure. In step (b1), if the carbon nanotube structure includes a plurality of carbon nanotube films or carbon nanotube wires, then step (b1) can be performed by adhering one end of each carbon nanotube film or carbon nanotube wire to the linear structure in sequence. The step (b1) can also be performed by combining the plurality of carbon nanotube films or carbon nanotube wires first, and then adhering one end of the combination of the plurality of carbon nanotube films or carbon nanotube wires.

In one embodiment, if the carbon nanotube structure is made from a carbon nanotube array, the step (a) can provide a linear structure and a carbon nanotube array. The step (b) can include steps: (b1), drawing a drawn carbon nanotube film or untwisted carbon nanotube wire from the carbon nanotube array; (b2), adhering the drawn carbon nanotube film or untwisted carbon nanotube wire to the linear structure; and (b3), rotating the linear structure with the carbon nanotube array, and simultaneously moving the linear structure or the carbon nanotube structure along a fixed direction. The drawn carbon nanotube film or untwisted carbon nanotube wire can be continuously drawn from the carbon nanotube array. The first carbon nanotube composite wire structure can be continuously produced.

The step (b) can further include a step of treating the carbon nanotube composite wire structure using an organic solvent. Specifically, the carbon nanotube structure is treated by spreading the organic solvent on the entire surface of the structure wound around the linear structure, or immersing the linear structure with the carbon nanotube structure into the organic solvent. The organic solvent is volatilizable and can be ethanol, methanol, acetone, dichloroethane, chloroform, or combinations thereof. After being soaked by the organic solvent, the carbon nanotube structure can be compacted and decrease the adhesiveness of the carbon nanotube structure due to the decrease of the surface tension of the carbon nanotube structure.

The step (c) can be executed by dipping the first carbon nanotube composite wire structure into the polymer liquid, injecting the polymer liquid into the first carbon nanotube composite wire structure, or coating the polymer liquid on a surface of the first carbon nanotube composite wire structure. The polymer liquid can be a polymer solution or melted polymer. The polymer in the polymer liquid can be epoxy resin, acrylic resin, polyimides, polyvinyl alcohol, polyester, silastic, thermal conductive adhesive, or any other organic materials. In one embodiment, the step (c) includes: dispersing the silastic into aether to form silastic solution; immersing the first carbon nanotube composite wire structure into the silastic solution; adding a little curing agent of epoxy resin into the silastic solution, and then curing more than two hours to make carbon nanotubes composite with silastic. The curing agent of epoxy resin can be substituted with basic curing agent, acid curing agent, or other curing agent.

The step (d) can be performed by a chemical method, or a physical method, such as a mechanical method. In one embodiment, if the linear structure is made of an active metal or an alloy composed of active metals, such as iron, aluminum, or an alloy thereof, the step (d) can include a step of applying the second carbon nanotube composite wire structure into an acidic liquid to react the linear structure with the acidic liquid. The acidic liquid can be nitric acid, sulfuric acid, hydrochloric acid, or other suitable acidic liquid. If the material of the linear structure is an inactive metal or an alloy consisting of inactive metals, such as gold, silver, or an alloy thereof, the step (d) can include a step of heating the second carbon nanotube composite wire structure to evaporate the linear structure. If the material of the linear structure is a polymer material, metal, or an alloy, the step (d) can include a step of pulling the linear structure out from the second carbon nanotube composite wire structure using a stretching device along the axial direction of the linear structure. Therefore, the figure and the effective diameter of the linear structure can dictate the figure and effective diameter of the through hole 14 of the carbon nanotube composite hollow structure 10. The outline of the carbon nanotube composite hollow structure 10 can also be decided by the linear structure.

Figure 10:
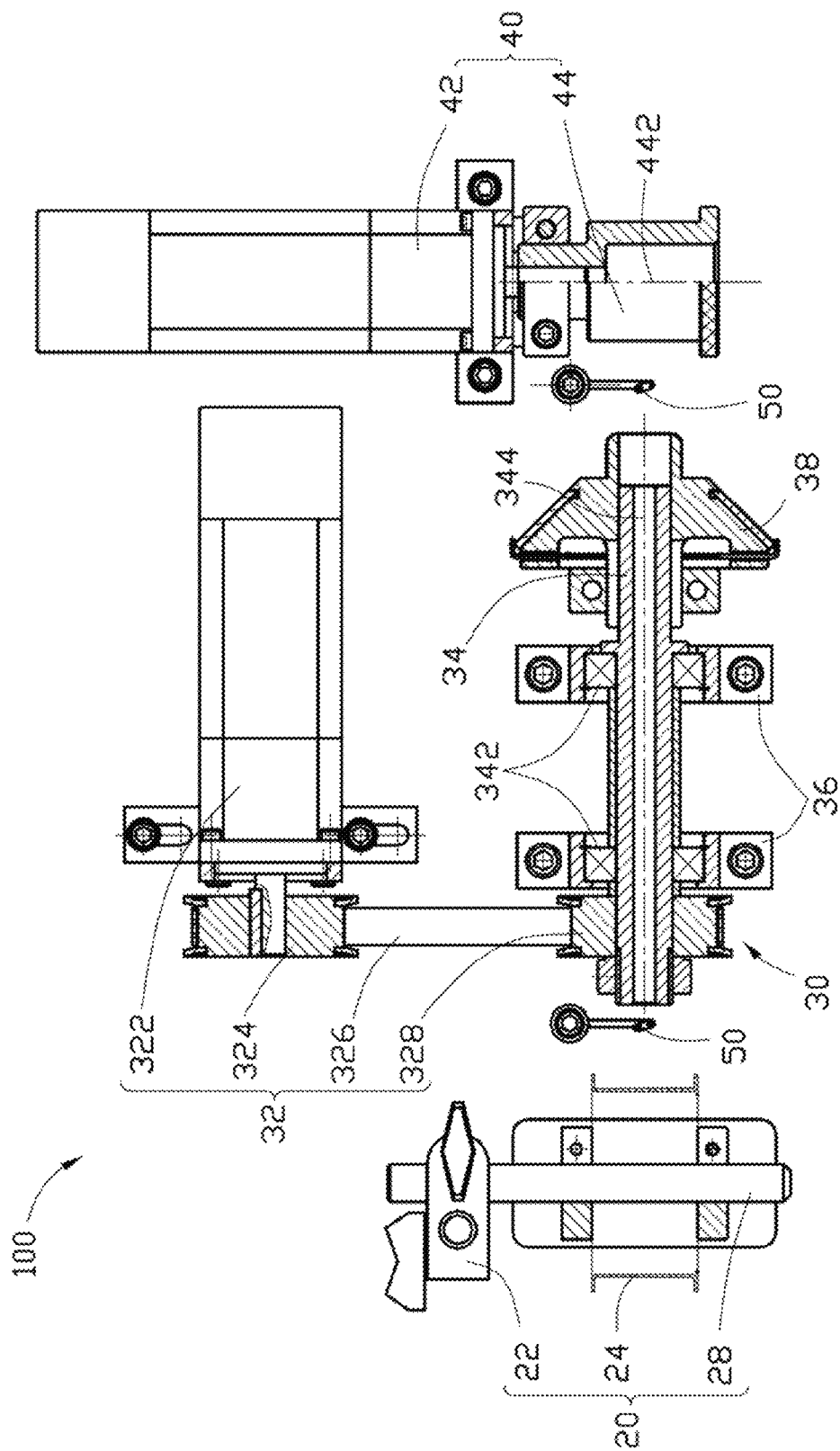
FIG. 10 is a top view of an apparatus partially cut-away for making the carbon nanotube composite hollow structure shown in FIG. 1.
Figure 11:
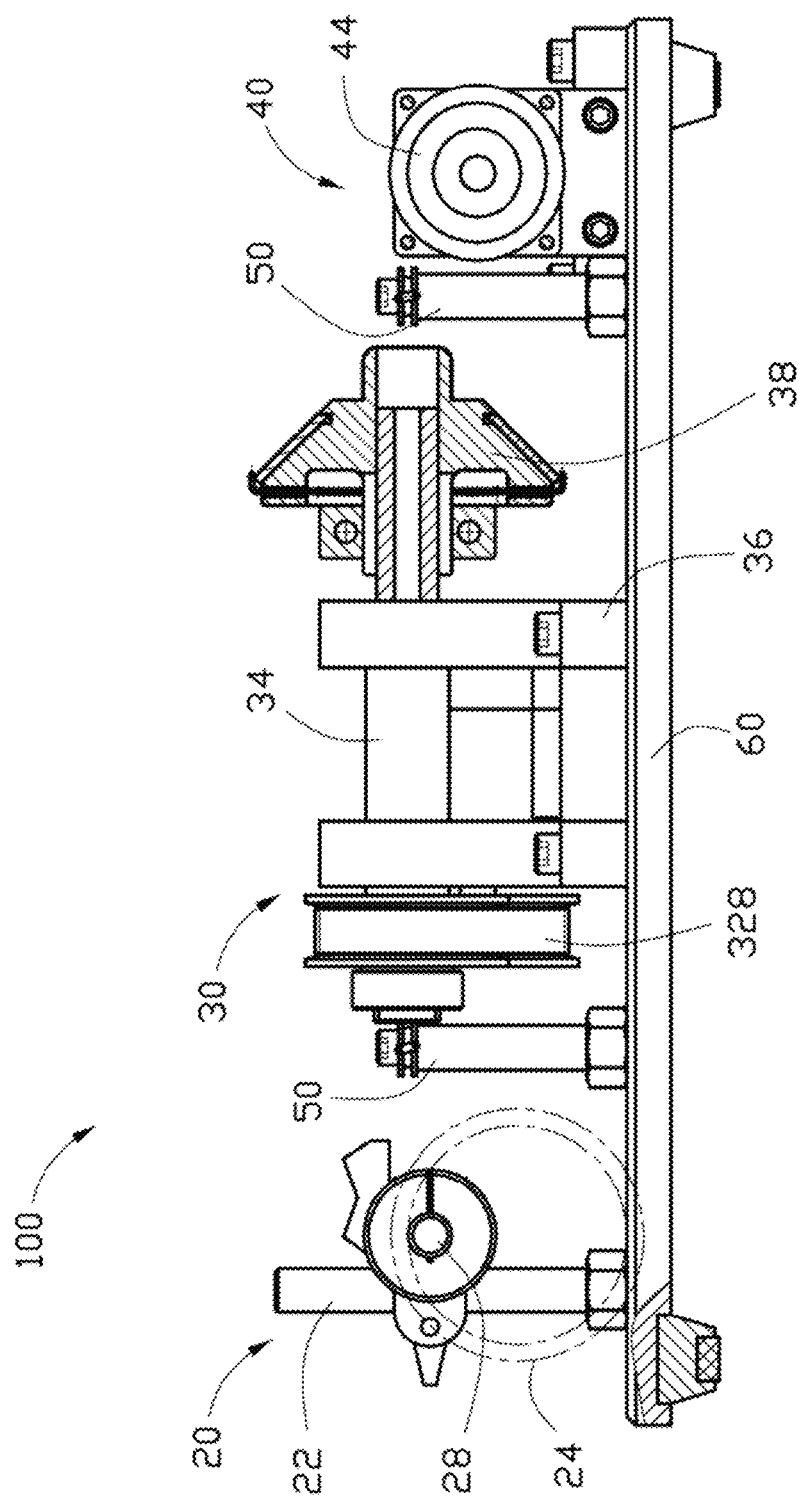
FIG. 11 is a frontal, partially cut-away view of the apparatus shown in FIG. 10.

In one embodiment, the carbon nanotube structure is made of at least one drawn carbon nanotube film, at least one untwisted carbon nanotube wire, or a combination thereof. The carbon nanotube composite hollow structure can be executed by an apparatus 100 shown in FIG. 10 and FIG. 11. The apparatus 100 can include a supply unit 20, a wrapping unit 30, and a collecting unit 40. The supply unit 20 supplies a linear structure. The wrapping unit 30 can load at least one carbon nanotube array (not shown) thereon. A carbon nanotube structure (not shown) can be drawn from the at least one carbon nanotube array. The carbon nanotube structure can be at least one drawn carbon nanotube film, at least one untwisted carbon nanotube wire, or a combination thereof. The wrapping unit 30 wraps the carbon nanotube structure around the linear structure, thereby forming the carbon nanotube composite wire structure. The collecting unit 40 can drive the linear structure to move along a fixed direction and collect the carbon nanotube composite wire structure.

The supply unit 20 can include a pedestal 22, a guiding shaft 28, and a bobbin 24. The pedestal 22 is substantially perpendicular to the supporter 60 by fixing one end of the pedestal 22 with respect to the supporter 60. One end of the guiding shaft 28 is fixed on the pedestal 22, and the other end is suspended. The guiding shaft 28 is substantially perpendicular to the pedestal 22. The bobbin 24 is hung on the guiding shaft 28, and can be freely moved around the guiding shaft 28. The bobbin 24 winds a linear structure thereon. The linear structure can be a conductive thread structure or a non-conductive thread structure. The non-conductive thread structure can be a carbon fiber, an artificial fiber such as Kevlar, or a natural fiber. The natural fiber can be spider silk or silkworm silk. The conductive thread structure can be a metal thread, an alloy thread, a conductive polymer thread, or a combination thereof.

The wrapping unit 30 can be configured to load a carbon nanotube array with a growing substrate for growing the carbon nanotube array. The wrapping unit 30 can include a drive mechanism 32, a hollow rotating shaft 34, two bearings 342, two braces 36, and a face plate 38. The drive mechanism 32 is positioned at one end of the hollow rotating shaft 34 close to the supply unit 20. The face plate 38 is located at the other end of the hollow rotating shaft 34. The two bearings 36 are separately harnessed to the hollow rotating shaft 34. Each brace 36 couples with a bearing 342 to support the hollow rotating shaft 34.

The drive mechanism 32 drives the hollow rotating shaft 34 to rotate. The hollow rotating shaft 34 is rotated to allow the face plate 38 to rotate. The drive mechanism 32 can include a first motor 322, a first belt pulley 324, a second belt pulley 328, and a belt 326. The first belt pulley 324 is mounted on the first motor 322. The second belt pulley 328 is separated from the first belt pulley 324, and mounted on the hollow rotating shaft 34. The belt 326 is harnessed to the first belt pulley 324 and the second belt pulley 328. The first belt pulley 324 can be rotated under the first motor 322. The first belt pulley 324 can drive the second belt pulley 328 to rotate by the belt 328. The second belt pulley 328 drives the hollow rotating shaft 34 to rotate. Therefore, a speed of the first motor 322 can control a rotating speed of the hollow rotating shaft 34. The structure of the drive mechanism 32 is not restricted by the above description, provided the drive mechanism 32 can drive the hollow rotating shaft 34 to rotate.

The hollow rotating shaft 34 is a tube-shaped structure. The hollow rotating shaft 34 defines a first axis 344 substantially overlapping with the linear structure, if the linear structure passes through the hollow rotating shaft 34. The hollow rotating shaft 34 can be rotatable clockwise or anti-clockwise around the first axis 344 by the driving mechanism 32.

The face plate 38 is harnessed on the hollow rotating shaft 34, such that the face plate 38 can accompany the hollow rotating shaft 34 to rotate around the first axis 344. The hollow rotating shaft 34 is driven by the first motor 322 such that the rotating speed of the face plate 38 is controlled by the speed of the first motor 322. The shape of the face plate 38 is similar to a frustum pyramid, such as a triangular frustum pyramid, a quadrangular frustum pyramid, a pentangular frustum pyramid, a hexangular frustum pyramid, or a heptangular frustum pyramid. The face plate 38 has a plurality of side faces. A support stage protrudes from each side face. A plurality of support stages locates the carbon nanotube array. Each support stage can define an angle with the first axis of the hollow rotating shaft 34, and faces the collecting unit 40. A plurality of support stages (not labeled) uniformly surrounds the hollow rotating shaft 34. In one embodiment, the shape of the face plate 38 is similar to a hexangular frustum pyramid. Six support stages protrude from the side faces of the hexangular frustum pyramid. Each support stage can define the angle of about 45 degrees with the first axis 344 of the hollow rotating shaft 34.

The collecting unit 40 can include a second motor 42, and a collecting shaft 44 fixed on the second motor 42. The collecting shaft 44 can be substantially perpendicular to the hollow rotating shaft 34. The collecting shaft 44 can rotate around a second axis 442 of the collecting shaft 44 under the second motor 42. The second axis 442 is substantially perpendicular to the first axis 344, such that the linear structure can be driven along a fixed direction, and the carbon nanotube composite wire structure can be collected on the collecting shaft 44. Therefore, the second motor 42 can control the rotating speed of the collecting shaft 44. The second motor 42 can also control the collecting speed of the carbon nanotube composite wire structure.

The apparatus 100 can further include two locating elements 50. Each locating element 50 defines a locating hole (not labeled). The center of the locating hole and the first axis 344 of the hollow rotation shaft 34 are substantially collinear. The two locating elements 50 ensure the linear structure is substantially maintained at a same plane and does not contact the inner wall of the hollow rotation shaft 34. One locating element 50 is fixed between the supply unit 20 and the wrapping unit 30, thus the linear structure is suspended in the hollow rotation shaft 34. The other locating element 50 is positioned between the wrapping unit 30 and the collecting unit 40, so that the carbon nanotube composite wire structure made by the apparatus 100 and the linear structure can substantially stay on the same plane. The number of the locating elements 50 can be selected as desired.

Specifically, the method for making the carbon nanotube composite hollow structure using the apparatus 100 can include the steps:

S10, providing a linear structure by the supply unit 20;

S20, passing the linear structure through the wrapping unit 30, and fixing the linear structure on the collecting unit 40;

S30, providing a carbon nanotube structure by the wrapping unit 30, and adhering one end of the carbon nanotube structure to the linear structure;

S40, rotating the face plate 36 and moving the linear structure along a fixed direction to wind the carbon nanotube structure around the linear structure such that a first carbon nanotube composite wire structure is formed;

S50, applying a polymer liquid to the first carbon nanotube composite wire structure, thereby forming a second carbon nanotube composite wire structure; and S60, removing the linear structure from the second carbon nanotube composite wire structure.

The step S10 can include the steps: providing the linear structure coiled around the bobbin 24; and supporting the bobbin 24 with the linear structure on the guiding shaft 28. The bobbin 24 with the linear structure coiled thereon can be moved around the guiding shaft 28.

The step S20 can include the steps: passing a free end of the linear structure through the hollow rotation shaft 34, and fixing the free end of the linear structure on the surface of the collecting shaft 44. In one embodiment, the linear structure will pass through the two locating holes of the two locating elements 50 in sequence before the linear structure is fixed on the collecting shaft 44, wherein the linear structure substantially overlaps with the first axis of the hollow rotating shaft 34.

The step S30 can include the following sub-steps:

S31, providing at least one carbon nanotube array, wherein each carbon nanotube array is grown on a growing substrate;

S32, fixing each growing substrate on the face plate 36; and

S33, drawing a drawn carbon nanotube film or an untwisted carbon nanotube wire from each carbon nanotube array using a stretching tool, and adhering one end of the carbon nanotube film or untwisted carbon nanotube wire to the linear structure.

In step S31, the carbon nanotube array is composed of a plurality of carbon nanotubes. The plurality of carbon nanotubes can be single-walled carbon nanotubes, double-walled nanotubes, multi-walled carbon nanotubes, or any combination thereof. In one embodiment, the plurality of carbon nanotubes comprises substantially parallel multi-walled carbon nanotubes. The carbon nanotube array is essentially free of impurities, such as carbonaceous or residual catalyst particles. The carbon nanotube array can be a super aligned carbon nanotube array. A method for making the carbon nanotube array is unrestricted, and can be by chemical vapor deposition methods or other methods.

In step S32, each growing substrate with the carbon nanotube array grown thereon is fixed on the support stage 362 by adhesive, mechanical tools, or vacuum absorption.

In step S33, each carbon nanotube film or untwisted carbon nanotube wire can be formed by selecting one or more carbon nanotubes having a predetermined width from each carbon nanotube array, and pulling the carbon nanotubes at a uniform speed to form carbon nanotube segments that are joined end to end to achieve the uniform drawn carbon nanotube film or untwisted carbon nanotube wire. During the pulling process, as the initial carbon nanotube segments are drawn out, other carbon nanotube segments are also drawn out end to end due to van der Waals attractive force between ends of adjacent segments. The stretching tool can be a ruler, tweezers, or an adhesive tape.

It is noted that because the carbon nanotubes in the carbon nanotube array have a high purity and a high specific surface area, the drawn carbon nanotube film or untwisted carbon nanotube wire is adhesive. As such, the carbon nanotube film or untwisted carbon nanotube wire can be adhered to the surface of the linear structure directly and a plurality of drawn carbon nanotube films or untwisted carbon nanotube wires can be adhered to a surface one after another.

The step S40 can include the steps of operating the first motor 322 to rotate the face plate 38 and controlling the collecting unit 40 to move the linear structure along the fixed direction, such that the carbon nanotube structure is wound around the linear structure. Specifically, when the collecting unit 40 and wrapping unit 30 are operated, the linear structure can be continuously supplied by the supply unit 20 and move towards the collecting unit 40. The drawn carbon nanotube film or untwisted carbon nanotube wire can be continuously drawn from each carbon nanotube array. Simultaneously, the first motor 322 drives the hollow rotating shaft 34 to rotate around the first axis 344 of the hollow rotating shaft 34 along a first direction. If the hollow rotating shaft 34 rotates, the face plate 38 and the at least one carbon nanotube array located on the face plate 38 can be rotated around the first axis 344 of the hollow rotating shaft 34 along the first direction. The drawn carbon nanotube film or untwisted carbon nanotube wire stretched from each carbon nanotube array can be wrapped around the surface of the linear structure along the first direction. Therefore, the first carbon nanotube composite wire is formed. If the second motor 42 drives the collecting shaft 44 to rotate, the first carbon nanotube composite wire can be automatically wound around the collecting shaft 44. Thus, the first carbon nanotube composite wire can be continuously manufactured and collected on the collecting shaft 44. Therefore, the rotating speeds of the collecting shaft 44 and the face plate 38 cooperatively affect the thickness of the carbon nanotube layer.

In one embodiment, the step S40 can further include a step of repeating the above mentioned step S40, wherein the face plate 38 can be driven to rotate along a second direction opposite to the first direction by the first motor 322. Thus, the drawn carbon nanotube film or untwisted carbon nanotube wire is wound around the linear structure along the second direction.

In one embodiment, the carbon nanotube composite hollow structure 10 is a carbon nanotube silastic composite hollow structure. The carbon nanotube silastic composite hollow structure can be made by the following steps:

S100, providing an aluminum thread with a diameter of about 25 μm by the supply unit 20;

S200, passing the aluminum thread through the hollow rotation shaft 34, and fixing the aluminum thread on the collecting unit 40;

S300, providing six drawn carbon nanotube films by the wrapping unit 30, and adhering the six drawn carbon nanotube films to the aluminum thread;

S400, rotating the face plate 38 and pulling the aluminum thread along a fixed direction to wind the six drawn carbon nanotube films around the aluminum thread, thereby forming a carbon nanotube aluminum composite wire structure with a diameter of about 50 μm;

S500, applying a silastic solution to the carbon nanotube aluminum composite wire structure to form a carbon nanotube aluminum silastic composite wire structure; and S600, etching the aluminum thread in the carbon nanotube aluminum silastic composite wire structure with hydrochloric acid with a concentration of about 0.5 molars per liter (mol/L), to remove the aluminum thread.

According to the above description, the carbon nanotube composite hollow structure is a macro-scale hollow tube-shaped structure. The carbon nanotube composite hollow structure can be flexible, light-weight, with small thermal capacity and high strength. Therefore, the carbon nanotube composite hollow structure can be conveniently applied in various fields. Furthermore, the carbon nanotubes in the carbon nanotube composite hollow structure can be tightly combined via the polymer, such that the carbon nanotube composite hollow structure can have high tensile strength and high tensile index.

The macro-scale carbon nanotube composite hollow structure can be made by winding the carbon nanotube structure around the linear structure, applying polymer liquid to the wounded carbon nanotube structure, and removing the linear structure. The method for making the macro-scale carbon nanotube composite hollow structure is simple, and quickly producible. The carbon nanotube structure is a freestanding structure, and includes at least one carbon nanotube film or at least one carbon nanotube wire. The at least one carbon nanotube film or at least one carbon nanotube wire also has an adhesive property. After being wrapped around the linear structure, the overlapped carbon nanotube films or carbon nanotube wires can be adhered to each other by van der Waals attractive force. The polymer in the carbon nanotube composite hollow structure is formed by curing polymer on the carbon nanotube films or carbon nanotube wires. Thus, the carbon nanotube composite hollow structure can have a stable structure.

It is also to be understood that the above description and the claims drawn to a method may include some indication in reference to certain steps. However, the indication used is only to be viewed for identification purposes and not as a suggestion as to an order for the steps.

What is claimed is:

1. A method for making a carbon nanotube composite hollow structure, the method comprising:
   step (a) providing a supply unit, a collecting unit, and a wrapping unit comprising a hollow rotating shaft and a face plate mounted on the hollow rotating shaft, wherein a linear structure is supplied by the supply unit;
   step (b) passing the linear structure through the hollow rotating shaft and fixing the linear structure on the collecting unit;
   step (c) drawing a carbon nanotube structure from a carbon nanotube array loaded on the face plate, and adhering one end of the carbon nanotube structure to a part of the linear structure between the wrapping unit and the collecting unit;
   step (d) form a first carbon nanotube composite wire collected by the collecting unit by rotating the face plate and pulling the linear structure along a fixed direction such that the carbon nanotube structure wraps around the linear structure;
   step (e) forming a second carbon nanotube composite structure by applying a polymer liquid to the first carbon nanotube composite structure; and
   step (f) removing the linear structure from the second carbon nanotube composite structure.

2. The method of claim 1, wherein a material of the linear structure is metal, alloy, or plastics.

3. The method of claim 1, wherein the supply unit comprises a pedestal and a guiding shaft fixed on the pedestal, and the step (a) comprises: winding a bobbin with the linear structure, and hanging the bobbin wound by the linear structure on the guiding shaft, the bobbin being movable around the guiding shaft.

4. The method of claim 1, wherein a first locating element is applied between the supply unit and the wrapping unit, the first locating element comprises a first locating hole, a second locating element is applied between the wrapping unit and the collecting unit, the second locating element comprises a second locating hole, the second locating hole and the first locating hole are substantially in alignment with each other, and the step (b) comprises passing the linear structure through the first locating hole, the hollow rotating shaft, and the second locating hole in sequence, and fixing one end of the linear structure on the collecting unit.

5. The method of claim 1, wherein the step (c) comprises:
   (c1) growing the carbon nanotube array on a growing substrate;
   (c2) fixing the growing substrate with the carbon nanotube array grown thereon on the face plate;
   (c3) drawing a drawn carbon nanotube film or an untwisted carbon nanotube wire from the carbon nanotube array; and
   (c4) adhering the drawn carbon nanotube film or the untwisted carbon nanotube wire to the linear structure.

6. The method of claim 1, wherein the collecting unit comprises a collecting shaft being rotatable around a second axis thereof, and the step (d) comprises:
   (d1) rotating the collecting shaft such that the linear structure is moved along the fixed direction and the carbon nanotube structure is drawn from the carbon nanotube array;
   (d2) forming the first carbon nanotube composite wire structure by simultaneously rotating the face plate such that the carbon nanotube structure rotates around the linear structure; and
   (d3) winding the first carbon nanotube composite wire structure around the collecting shaft.

7. The method of claim 1, wherein in the step (c), the applying the polymer liquid to the first carbon nanotube composite structure is carried out by dipping the first carbon nanotube composite wire structure into the polymer liquid, injecting the polymer liquid into the first carbon nanotube composite wire structure, or coating the polymer liquid on a surface of the first carbon nanotube composite wire structure.

8. The method of claim 7, wherein the polymer liquid comprises epoxy resin, acrylic resin, polyimides, polyvinyl alcohol, polyester, silastic, or thermal conductive adhesive.

9. The method of claim 1, wherein the removing the linear structure is executed by a chemical method or a physical method.

10. A method for making a carbon nanotube composite hollow structure, the method comprising:
    step (a) providing a supply unit, a hollow rotating shaft, a face plate mounted on the hollow rotating shaft, and a collecting unit shaft, wherein a linear structure is supplied by the supply unit;
    step (b) passing the linear structure through the hollow rotating shaft, and fixing the linear structure on the collecting shaft;
    step (c) applying a carbon nanotube array on the face plate;
    step (d) drawing a carbon nanotube structure from the carbon nanotube array and adhering one end of the carbon nanotube structure to part of the linear structure between the wrapping unit and the collecting unit;
    step (e) forming a first carbon nanotube composite structure by rotating the face plate and pulling the linear structure along a fixed direction to wind the carbon nanotube structure around the linear structure;
    step (f) applying a polymer liquid to the first carbon nanotube composite structure such that a second carbon nanotube composite structure is formed; and
    step (g) removing the linear structure from the second carbon nanotube composite structure.

11. The method of claim 10, wherein the supply unit comprises a pedestal, a guiding shaft fixed on the pedestal, and two collars, and the step (a) comprises:
    providing a bobbin with the linear structure coiled thereon;
    hanging the bobbin on the guiding shaft, the bobbin being movable around the guiding shaft; and
    positioning the bobbin with the linear structure between the two collars mounted on the guiding shaft.

12. The method of claim 10, wherein a first locating element is applied between the supply unit and the wrapping unit, the first locating element defines a first locating hole, a second locating element is applied between the wrapping unit and the collecting unit, the second locating element defines a second locating hole, the second locating hole and first locating hole are substantially in alignment with each other, and the step (b) comprises passing the linear structure through the first locating hole, the hollow rotating shaft, and the second locating hole in sequence, and fixing one end of the linear structure on the collecting shaft.

13. The method of claim 12, wherein the step (d) comprises drawing a drawn carbon nanotube film or an untwisted carbon nanotube wire from the carbon nanotube array, and adhering the drawn carbon nanotube film or the untwisted carbon nanotube wire to the linear structure.

14. The method of claim 13, wherein the collecting shaft is rotatable around a second axis thereof, the hollow rotating shaft is rotatable around a first axis thereof, and the step (e) comprises:
    rotating the collecting shaft such that the linear structure is pulled along the fixed direction from the bobbin and the drawn carbon nanotube film or the untwisted carbon nanotube wire is drawn from the carbon nanotube array;
    simultaneously rotating the hollow rotating shaft, such that the face plate is rotated around the first axis of the hollow rotating shaft and the drawn carbon nanotube film or the untwisted carbon nanotube wire is rotated around the linear structure, thereby forming the carbon nanotube composite wire structure; and
    winding the carbon nanotube composite wire structure around the collecting shaft.

15. The method of claim 10, wherein in the step (f), the applying the polymer liquid to the first carbon nanotube composite structure is carried out by dipping the first carbon nanotube composite wire structure into the polymer liquid, injecting the polymer liquid into the first carbon nanotube composite wire structure, or coating the polymer liquid on a surface of the first carbon nanotube composite wire structure.

16. The method of claim 15, wherein the removing the linear structure is executed by a chemical method or a physical method.

17. A method for making a carbon nanotube composite hollow structure, the method comprising:
    step (a) providing a supply unit, a wrapping unit, and a collecting unit, the supply unit comprising a pedestal, a guiding shaft fixed on the pedestal, and a bobbin hung on the guiding shaft, the wrapping unit comprising a hollow rotating shaft being rotatable around a first axis thereof, and a face plate mounted on the hollow rotating shaft, the collecting unit comprising a collecting shaft rotatable around a second axis thereof, and the second axis of the collecting shaft being substantially perpendicular to the first axis of the hollow rotating shaft;
    step (b) supplying a linear structure from the bobbin;
    step (c) passing the linear structure through the hollow rotating shaft and fixing the linear structure on the collecting shaft;
    step (d) applying a carbon nanotube array on the face plate;
    step (e) drawing a carbon nanotube structure from the carbon nanotube array, and adhering one end of the carbon nanotube structure to part of the linear structure between the wrapping unit and the collecting unit;
    step (f) forming a first carbon nanotube composite wire collected on the collecting shaft by rotating the hollow rotating shaft around the first axis thereof, and simultaneously rotating the collecting shaft around the second axis thereof;
    step (g) forming a second carbon nanotube composite structure by applying a polymer liquid to the first carbon nanotube composite structure; and
    step (h) removing the linear structure from the second carbon nanotube composite structure.

18. The method of claim 17, wherein the wrapping unit further comprises a drive mechanism comprising a first motor, and an actuator mounted on the first motor and the hollow rotating shaft, and in step (d), the rotating the hollow rotating shaft comprises operating the first motor to cause the actuator to rotate the hollow rotating shaft around the first axis thereof such that the face plate is rotated around the first axis of the hollow rotating shaft, wherein the carbon nanotube array is rotated around the linear structure, such that the carbon nanotube film is wrapped around the linear structure to form the carbon nanotube composite wire structure.

19. The method of claim 18, wherein the collecting unit further comprises a second motor, and the collecting shaft is mounted on the second motor, and in step (d), the pulling the linear structure comprises operating the motor to rotate the collecting shaft around the second axis thereof such that the linear structure is drawn from the bobbin along the fixed direction, the carbon nanotube structure is drawn from the carbon nanotube array, and the first carbon nanotube composite wire structure is wrapped around the collecting shaft.

20. The method of claim 19, wherein the removing the linear structure is executed by a chemical method or a physical method.

* * * * *